United States Patent [19]

Miller et al.

[11] 4,327,152

[45] Apr. 27, 1982

[54] PROTECTIVE COATING TO RETARD CRACK GROWTH IN ALUMINUM ALLOY

[75] Inventors: Robert N. Miller, Acworth; Richard L. Smith, Atlanta, both of Ga.

[73] Assignee: Lockheed Corporation, Burbank, Calif.

[21] Appl. No.: 191,371

[22] Filed: Sep. 29, 1980

[51] Int. Cl.[3] ........................ B32B 15/08; B32B 27/40; B32B 27/38; C23F 11/14

[52] U.S. Cl. .................................. 428/419; 148/6.27; 428/411; 428/413; 428/416; 428/423.1; 428/423.5; 428/425.8; 428/457; 428/458

[58] Field of Search ............... 148/6.27; 428/419, 411, 428/423.1, 423.5, 425.8, 457, 458, 413, 416

[56] References Cited

U.S. PATENT DOCUMENTS 3,382,081 5/1968 Cutter ................................ 148/6.27
3,787,246 1/1974 Tagai ................................. 148/6.27

FOREIGN PATENT DOCUMENTS 49-35493 9/1974 Japan ................................. 148/6.27
52-31891 8/1977 Japan ................................. 148/6.27

*Primary Examiner*—Ellis P. Robinson
*Attorney, Agent, or Firm*—John J. Sullivan

[57] ABSTRACT

A protective coating to retard crack growth in aluminum and aluminum alloys has particular utility when applied to the surfaces of structural parts of aircraft providing a crack growth inhibitor to a crack surface when and as it develops in such parts. This inhibitor is a compound having a vapor pressure high enough to volatilize the inhibitor and emit molecules which will react with the surface of the metal to form a protective film. It is blended within a selected primer and is thereby available for interaction with the surface and tip of any crack which may initiate beneath the primer. A topcoat of low-permeability polyurethane covers the inhibitor-reinforced primer to prevent escape of the inhibitor from the primer.

4 Claims, No Drawings

PROTECTIVE COATING TO RETARD CRACK GROWTH IN ALUMINUM ALLOY

TECHNICAL FIELD

This invention relates to protective coatings for aluminum alloys and particularly to protective coatings to retard crack growth in such alloys.

A major limitation in the life of modern aircraft is the development and growth of fatigue cracks in the airframe structure. Aircraft are designed so that cracks in structural parts will not grow to a critical length during the life of the aircraft. These designs are based on data obtained by fatigue testing precracked specimens under controlled laboratory conditions. Typically, this would be at room temperature and at a relative humidity of about fifty percent (50%). Humid environments accelerate the rate of fatigue crack propagation.

Aircraft which operate in coastal regions have a shortened life span unless the environment effects are neutralized. This is accomplished in part, by protecting all structural parts with paint systems which contain corrosion inhibitors and which are relatively impermeable to the diffusion of moisture. Such protective paints are of no effect, however, once a crack is initiated and the base metal becomes exposed.

BACKGROUND ART

Combinations of inhibitors have been heretofore proposed which are effective in slowing the rate of crack propagation in high strength steel. "Inhibition of Crack Propagation of High Strength Steels through Single and Mulifunctional Inhibitors" AFML-TR-76-120, August 1976 describes how crack growth in high strength, low alloy steels may be retarded when maintained in a aqueous solution by the presence of oxidizing inhibitors such as chromate or by the presence of nitrite ions. It also demonstrates that a combination of borax and nitrite are more effective than single inhibitors in controlling crack propagation in high strength steels provided these are maintained in liquid. Experimental results showed this system to be equally effective in the presence of sodium chloride and in both sustained load stress-corrosion and cyclic load corrosion-fatigue conditions.

The literature also contains data on the use of inhibitors to slow crack growth in aluminum alloys. Again, an aqueous solution is essential to this operation. "Mechanisms of Corrosion Fatigue Crack Propagation in Al-Zn-Mg Alloys" MIT, Department of Metallurgy and Materials Science, February 1972 discloses that the addition of nitrite ions drastically reduces the corrosion fatigue crack growth rates of peak aged 7075-T6 aluminum tested in sodium chloride solution. The nitrite ions displace the chloride ions from the crack tip and change the fracture morphology from brittle to ductile. In "Material Evaluation: Part II-Development of Corrosion Inhibitors", AFML-TR-79-4127, September 1979, retardation of crack growth in high strength aluminum alloys exposed to distilled water and to 0.1 Molar sodium chloride solutions is effected through the use of borax-nitrite and piperazine inhibitors.

In summary, the prior art disclosures on the use of inhibitors to control crack growth rate are predicated upon a continuous exposure of the crack path to solutions which contain the inhibitors. In the airplane application there is no liquid to carry the inhibitor to the crack tip and surfaces. At best, therefore, the prior art practices have been to periodically wash or rinse the aircraft with solutions containing the various inhibitors in an effort primarily to remove all salt residue which are known to accelerate crack growth.

DISCLOSURE OF INVENTION

The present invention appreciates the above shortcomings in the state of the art and proposes to overcome these by the provision of a protective coating especially designed and adapted to retard crack growth in aluminum and aluminum alloy. In so doing it is recognized at the outset to more closely approximate the normal aircraft environmental exposure, namely air with varying degrees of relative humidity; but most important there is no liquid to convey the inhibitor to the crack surfaces and tip.

In contrast to the prior art, therefore, the method of inhibition envisioned by the present invention is absorption of volatile crack growth inhibitors on the freshly generated fracture surface and at the tip of the advancing crack. To this end it is proposed herein to employ such a crack growth inhibitor incorporated into a selected primer for stress-critical areas where the inhibitor volatilizes and is available for reaction with the fresh surface of any crack which might form. This volatile crack growth inhibitor reinforced primer may be and preferably is covered with a low-permeability organic film, as a topcoat to prevent the loss of the inhibitor to the atmosphere.

More specifically, the proposed volatile crack growth inhibitor is a compound having a high vapor pressure which will react with the surface of the metal to form a protective film. It is blended with the primer, which is an organic paint, i.e., a polymeric organic material mixed with a solvent to facilitate its application in the form of a thin film over a substrate or metal. This primer is one which is compatible with the selected inhibitor with respect to the curing properties thereof and the physical properties of the ultimate coating. Preferably either MIL-P-23377 epoxy-polyamide or MIL-P-87112 polysulfide are to be used in this application. The epoxy-polyamide material is obtainable from Andrew Brown Division of Koppers Company, Inc., 656 Owenby Drive, Marietta, Georgia 30060 or from DeSota, Inc., 1700 S. Mound Prospect Road, DesPlaines, Illinois 60018. The polysulfide material is obtainable from Products Research and Chemical Corporation, 2919 Empire Avenue, Burbank, California 91504 under the company designation PR-1432GP.

BEST MODE FOR CARRYING OUT THE INVENTION

To the primer, either the epoxy-polyamide or the polysulfide material, add approximately 5%, i.e. between 4% and 6% by weight of the volatile crack growth inhibitor. The most effective inhibitors have been found to be (1) a fatty acid amine such as that known commercially as CORTEC VCI 560 compound and obtainable from ACR Electronics, Inc., 3901 North 29th Avenue, Hollywood, Florida 33020, and (2) an cyclic amine compound, preferably one which is the reaction product of hexafluoroisopropanol and cyclohexylamine mixed in a 1 to 1 molar ratio. The cyclic amine is preferred over the fatty acid amine because when compounded as herein proposed it is effective not only in retarding the cracking growth of aluminum in a high humidity environment but also has no detrimental effect in a moisture free situation. All other known volatile crack growth inhibitors including CORTEC VCI 560 compound are significantly effective only in a humid environment and in the absence of moisture, accelerate to some degree the rate of crack growth which can be highly objectionable in some aircraft operational areas.

The preferred method of mixing the inhibitor with the primer is to calculate the amount of inhibitor needed to make approximately a 5% by weight formulation. The correct weight of inhibitor is then dissolved in just enough methyl ethyl ketone solvent to dissolve it completely. All mixing operations are done at room temperature, i.e., about 80° F. (23.3 Celsius).

Both of the above named primers are two part systems, i.e., composed of a base material and a catalyst. The catalyst is added to the base material and thoroughly mixed. The methyl ethyl ketone containing the dissolved corrosion inhibitor is then mixed with the primer. Where a one part system primer is employed the corrosion inhibitor dissolved in the methyl ethyl ketone is blended directly into the primer.

The ultimate coating may be applied to the aircraft or aircraft part by the conventional methods of spraying or brushing. Inasmuch as the inhibitors are volatile and tend to evaporate from the primer, it is recommended that the inhibitor reinforced primer be overcoated as stated above with a low permeability topcoat. An acrylic, epoxy resin or polyurethane may be employed for this purpose, the polyurethane paint often used on aircraft being the preferred. If a crack should initiate beneath the topcoat, the inhibitor vapor reacts with the fresh surface and slows down any further growth of the crack.

Comparative Tests

In order to demonstrate the effectivity of the protective coating of this invention the following test is offered:

- a strip of 7075-T6 aluminum 24 inches (60.96 cm) long, 4 inches (10.16 cm) wide and 0.1 inches (0.254 cm) thick was prepared with three (3) machined slots at spaced intervals.
- the strip was subjected to loads fluctuating between 2,500 and 10,000 psi (1795.5 and 7190 kilograms per square centimeter) at a rate of 6 cycles per minute until an initial crack developed in the strip adjacent each slot.
- the back side of the top slot was painted with about a 0.001 inch (0.00254 cm) thick film of standard epoxy polyamide primer (MIL-P-23377 which includes about 8% chromate corrosion inhibitor).
- the back side of the middle slot was painted with about a 0.001 inch (0.00254 cm) thick film of the same primer formulated with 5% by weight of an cyclic amine vapor phase inhibitor (hexafluoroisopropanolcyclohexylamine).
- the bottom slot was left untreated as the control.
- a Petri dish in which a water saturated swab of cotton was placed was sealed around each slot to assure a 100% relative humidity atmosphere.
- the strip was cycled as before until the most rapidly growing crack reached the length of 1 inch (2.54 cm). While cycling the three crack lengths were monitored at regular intervals of about 2 hours with the aid of a 20 power microscope and a tabulation was made of stress cycles versus crack length for each of the cracks.

Following are the results after 25,000 fatigue cycles:

Bottom Slot (Control):0.24 inches (0.609 cm)

Top Slot:0.19 inches (0.483 cm)

Middle Slot:0.06 inches (0.152 cm)

The above shows that the crack exposed to the protective coating of this invention (middle slot) grew at about 25% of that of the control (bottom slot) while the crack exposed to the standard primer with corrosion inhibitor grew at about 76% of that of the control. Stated differently, the crack exposed to the protective coating herein proposed grew at about one-third the rate of the crack exposed to the standard primer with corrosion inhibitor.

In order to establish the superiority of a cyclic amine volatile inhibitor, over other amine volatile inhibitors in a low humidity (dry) environment tests were conducted in a similar manner as above except that no primers were used and the test inhibitors were deposited in the Petri dish without actual contact with the associated crack and one (1) gram of silica gel dessicant was substituted for the water saturated swab. The same cycling and monitoring procedures were followed and the results are tabulated below:

| Inhibitor | Crack Length at 40,000 Cycles |
|---|---|
| None (Control) | 0.12 inches (0.305 cm) |
| Cyclic Amine (Hexafluoroisopropanol-Cyclohexylamine) | 0.11 inches (0.279 cm) |
| Non-Cyclic Amine (Thiourea) | 0.40 inches (1.016 cm) |
| (Guanine) | 0.15 inches (0.381 cm) |

The above shows that the non-cyclic amines actually increase the rate of crack growth compared with the control while the cyclic amine produced a slight decrease in crack growth rate. The two non-cyclic amines selected above show the relatively wide range of crack growth with the particular amine. In no case tested, however, did any non-cyclic amine perform as well as the control specimen when exposed to a dry environment. Of the cyclic amines tested only hexafluoroisopropanol-cyclohexylamine outperformed the control specimen in a dry environment.

We claim:

1. A protective coating to retard crack growth in aluminum alloy when applied thereto comprising:

an amine compound which is the reaction product of hexafluoroisopropanol and cyclohexylamine mixed in a 1 to 1 molar ratio mixed with a primer in a concentration of approximately 5% by weight, said primer being a polymeric organic material mixed with a solvent and compatible with said compound with respect to the curing properties thereof of the ultimate coating; and a low-permeability organic film topcoat overlying and covering the compound and primer mixture aforesaid.

2. The coating of claim 1 wherein said primer is an epoxy polyamide.

3. The coating of claim 1 wherein said primer is a polysulfide.

4. The coating of claim 1 wherein said low-permeability organic film topcoat is polyurethane.

* * * * *